United States Patent [19]

Yamazaki et al.

[11] Patent Number: 5,712,038
[45] Date of Patent: Jan. 27, 1998

[54] VIBRATION DAMPER MATERIAL

[75] Inventors: Motoki Yamazaki, Hamamatu; Toshio Sugizaki, Ohmiya; Masao Kogure, Saitama-ken; Takanori Saitoh, Misato, all of Japan

[73] Assignee: Lintec Corporation, Japan

[21] Appl. No.: 361,829

[22] Filed: Dec. 22, 1994

[30] Foreign Application Priority Data

Dec. 28, 1993 [JP] Japan .................................. 5-350599

[51] Int. Cl.$^6$ .................. B32B 27/00; B32B 11/00; B32B 25/00
[52] U.S. Cl. .................. 428/411.1; 428/220; 428/332; 428/339; 428/41.8; 428/343; 428/352; 428/423.1; 428/489; 428/304.4; 442/74
[58] Field of Search .................. 428/220, 290, 428/291, 304.4, 332, 339, 343, 352, 354, 411.1, 423.1, 489, 41.8; 181/207, 208

[56] References Cited

U.S. PATENT DOCUMENTS

| 3,685,635 | 8/1972 | Eustice . | |
|---|---|---|---|
| 4,056,161 | 11/1977 | Allen, Jr. | 181/290 |
| 4,278,726 | 7/1981 | Wieme | 428/229 |
| 4,347,280 | 8/1982 | Lau et al. | 428/304.4 |
| 4,766,028 | 8/1988 | Rich | 428/253 |
| 4,981,737 | 1/1991 | Rico | 428/40 |
| 5,013,591 | 5/1991 | Haushofer et al. | 428/354 X |
| 5,300,360 | 4/1994 | Kocsis et al. | 428/304.4 |
| 5,435,842 | 7/1995 | Mukaida et al. | 106/672 |

FOREIGN PATENT DOCUMENTS

| 0320676 | 6/1989 | European Pat. Off. . |
|---|---|---|
| 2631667 | 11/1989 | France . |
| 52-81463 | 7/1977 | Japan . |
| 513171 | 10/1939 | United Kingdom . |
| 2113346 | 8/1983 | United Kingdom . |
| WO82/04454 | 12/1982 | WIPO . |

OTHER PUBLICATIONS

*Frequency and Loss Factors of Sandwich Beams Under Various Boundary Conditions,* Author: D. K. Rao; Journal Mechanical Engineering Science, vol. 20, No. 5, 1978.

*Primary Examiner*—Marie R. Yamnitzky
*Attorney, Agent, or Firm*—Brinks Hofer Gilson & Lione; G. Peter Nichols

[57] ABSTRACT

A vibration damper material 1 composed of a laminated sheet having a base stock layer 3, a resilient layer 4, an primer layer 5, an organic component barrier layer 6 and an adhesive layer 7 successively laminated in that order from one to the other side thereof, and a release liner 8 stuck on the adhesive layer 7. The resilient layer 4 is constituted by a resilient material containing a vehicle consisting of a member or a mixture of two or more members selected from the group of asphalt, rubber, synthetic resins and cellulose derivatives, synthetic resin powder, and an elastic material having an elongation rate of 500% or higher. The organic component barrier layer functions to block permeation therethrough of organic components such as tar and oil components which would otherwise tend to migrate into the adhesive layer from the resilient layer. Despite a substantial reduction in thickness, the vibration damper sheet possesses satisfactory vibration damping properties, along with excellent adhesion to curved surfaces and punching machinability and sticking machinability.

14 Claims, 4 Drawing Sheets

VIBRATION DAMPER MATERIAL

BACKGROUND OF THE INVENTION

1. Field of the Invention

This invention relates to a vibration damper material and method of manufacturing thereof, and in particular to a vibration damper material which can be suitably used, for example, as lining, sheathing, matting or covering sheets for various articles for the purpose of suppressing vibrations, and method of manufacturing thereof.

2. Description of the Prior Art

As for sheet materials with properties of damping vibrations and noisy sounds, there have been known in the art the vibration damper materials with a resilient layer of resilient material for suppression of vibrations. The vibration damper materials of this sort are usually intended to be adhered to or bonded on a body or an adherend which needs vibration damping. In these known vibration damper materials, there are two types, one of which has a structure including a rigid or a hard base body like a metal sheet and a resilient vibration damping layer formed on one side of the base body, and the other of which further includes a thermally melt type adhesive layer formed on the vibration damping layer.

However, in the former case, the base body is rigid and is formed into a flat shape. Therefore, difficulties are often encountered in machining the damper material, particularly in punching it into a desired shape. In addition, the damper material of this nature is barely flexible, making it difficult to bond the damper material adhesively on a curved surface of a pipe or the like. Further, in the latter case, since the adhesive layer needs to be pressed onto the body or member under heated conditions, the damper material similarly suffers from a problem of extremely inferior adhesion to curved surface (inferior adaptability to curved surface contour).

Therefore, when these damper materials are attached to an adherend or a structure with a round or curved surface, it has been the usual practice to preshape the base body of the damper material into conformity with the contour of the curved surface or to apply a paint with vibration damping properties on the curved surface, which results in taking much time and labor and therefore less applicability. Further, since these conventional damper materials are not bendable, there is another drawback in that it is difficult to wind them into coils or rolls which are preferable under certain conditions particularly in the case where the damper materials are formed into tapes or elongated strips.

Moreover, even if adhesion to a curved surface is feasible, the applications of the conventional vibration damper materials, which have a resilient vibration damping layer of a relatively large thickness, 10 mm or more, are normally limited to structures having a surface of small curvature (or a surface with a large radius of curvature). Therefore, difficulties are often experienced in bonding them on surfaces of large curvatures like surfaces on pipings of air conditioners and surfaces on tapping water pipings and the like, in addition to the difficulty of rolling the damper sheets into coils of high density.

Furthermore, in the case where sheets of a desired shape are punched out from a conventional damper material having a release liner bonded on the outer adhesive layer, the vibration damping layer of large thickness makes it difficult to punch out sheets of a complicated shape with satisfactory dimensional accuracy. The thick vibration resilient layer also makes it difficult to punch the damper material so that the release liner remains as it is. The release liner alone needs to be left unpunched in order to permit sticking method where the punched sheets are bonded in a predetermined position successively and automatically by a machine using the release liner as a carrier for the respective punched label units.

SUMMARY OF THE INVENTION

It is therefore an object of the present invention to provide a vibration damper material which is capable of damping vibrations effectively despite a substantial reduction in thickness and which is satisfactory in properties such as adhesion to curved surfaces, punching machinability and sticking machinability, the damper materials being retainable in the form of rolls or coils if necessary.

In order to achieve the above mentioned object, a vibration damper material according to the present invention comprises a laminated sheet including at least a flexible base stock layer, a resilient layer and an adhesive layer which are arranged in this order, wherein the damper material being imparted with vibration damping properties by the existence of the resilient layer.

According to the vibration damper material having the above described structure, despite the reduction in thickness, the vibration damper material of the present invention has excellent vibration damping and noise absorbing properties without frequency dependency. Besides, the high flexibility and pliability of the damper material ensures improved adhesion to curved surfaces (adaptability to curved surfaces), facilitating the bonding work on an object or structure with curved surfaces, especially on surfaces of large curvatures.

In addition, especially in the case where the damper material is of a sheet-like shape or tape-like shape, it can be retained in the form of a coil or roll and, because of the properties of its resilient layer, can be uncoiled or unrolled into a flat state free of permanently curled creased portions whenever necessary.

Furthermore, the excellent punching machinability of the damper material contributes to facilitate the fabrication of sheets of complicate shapes, while its relatively thin thickness especially realizes proper fitness in the punching operation. Particularly, no matter whether the punching operation is of the thorough mode punching through the release liner or the short mode leaving the release liner unpunched, the damper material of the invention permits to make adjustments easily for selecting an appropriate mode more freely in connection with the purpose of use and the bonding method to be employed. Accordingly, it becomes possible to carry out the sticking method in which shaped damper materials are automatically and successively stuck by a machine using an elongated release liner as a carrier for the respective sheets, permitting to improve the speed of automatic sticking operations drastically.

In the present invention, the above base stock layer is preferably formed of an air permeable material, which contributes to ensure uniform drying of the coated material in a favorable manner, preventing foaming or bubbling within the coated film and at the same time precluding the warping of the coated film which would result from uneven drying. Further, preferably the resilient layer contains synthetic resin powder and a vehicle consisting of a material or a mixture of two or more materials selected from the group consisting of asphalt, rubber, synthetic resins and cellulose derivatives. In this case, it becomes possible to obtain excellent vibration damping properties combined with its favorable water-proofing property and resistance to chemicals. Furthermore, the resilient layer is preferably constituted by an elastic material with an elongation rate of 15% or more, and more particularly the resilient layer contains 10 wt % to 100 wt % of an elastic material having an elongation rate of 500% or more in itself. In this case, the vibration damping properties and the adaptability to curved surfaces are further improved. The resilient layer is preferably formed by a coating method.

In this invention, preferably the damper material further comprises between the resilient layer and the adhesive layer an organic component barrier layer having a function of blocking permeation therethrough of organic components. In particular, when asphalt is used as a vehicle for the resilient layer, it becomes possible to prevent tar and oil components in the asphalt from being migrated into the adhesive layer. This barrier layer is preferably formed of materials having hydrophilic nature. If doing so, it becomes possible to improve hydrophilic property for the organic components such as tar or oil components which are unsoluble or hard to be soluble to water. Further, this organic component barrier layer is preferably bonded to the adhesive layer through a bonding layer, thereby improving bonding force between the resilient layer and the organic component barrier layer.

Further, in this invention, in order to obtain sufficient vibration dumping property and adaptability to curved surface, the laminated sheet is preferably formed into 0.2 mm to 5.0 mm in thickness and the resilient layer is preferably formed into 0.1 mm to 4.0 mm in thickness.

Furthermore, in this invention, one or both of outer surface layers of the laminated sheet may be constituted by an adhesive layer to which a release liner is stuck.

Moreover, in this invention, the vibration damper material can be constituted so as to have a laminated sheet including a flexible base stock layer, a resilient layer of an elastic material formed on the base stock layer and containing asphalt, synthetic resin powder and polyurethane, an organic component barrier layer for blocking permeation therethrough of organic components in the resilient layer, and an adhesive layer, wherein vibration damper material being imparted with vibration damping properties by the existence of the resilient layer.

Alternatively, the vibration damper material according to this invention can be formed from a laminated sheet including at least a flexible base stock layer of fibrous porous material having a first surface and a second surface opposite to the first surface, a resilient layer provided on the second surface of the base stock layer and having a vibration damping function, and an adhesive layer which is provided on the resilient layer at a second side thereof which is opposite to a first side of the resilient layer to which the base stock layer is located, wherein materials of the resilient layer or components thereof is penetrated into a part of the base stock layer in the thickness direction thereof. According to this alternative, it is possible to ensure bonding between the base stock layer and the resilient layer. Preferably, the base stock layer is formed from a non-woven fabrics, and the resilient layer is formed of an elastic body containing asphalt, polyurethane and synthetic resin powder. In this case, the resilient layer is preferably formed by a coating method in such a manner that structural materials of the resilient layer or components thereof are penetrated into the base stock layer so as not to be exposed at the first surface of the base stock layer. More preferably, the penetration of the materials or components of the resilient layer does not exceed 50% of the thickness of the base stock layer. Further, the materials or components of the resilient layer is preferably penetrated over the entire of the second surface of the base stock layer uniformly.

Alternatively, the method of manufacturing a vibration damper material according to the present invention comprises the steps of: providing a base stock layer formed from a fabrious porous material; forming a resilient layer having vibration damping function on the base stock layer by applying a coating agent containing asphalt, polyurethane and synthetic resin powder on one surface of the base stock layer; and forming an adhesive layer on a side of the resilient layer opposite to the side thereof on which the base stock layer is formed. Preferably, the coating agent is applied to the base stock layer so as not to be exposed on the other surface of the base stock layer.

The above and other features and advantages of the invention will become apparent from the following detailed description of the invention, taken in conjunction with the accompanying drawings which show by way of some preferred embodiments of the invention.

BRIEF DESCRIPTION OF THE INVENTION

Hereinafter, the invention will be described more particularly by way of its preferred embodiments with reference to the accompanying drawings.

Figure 1:
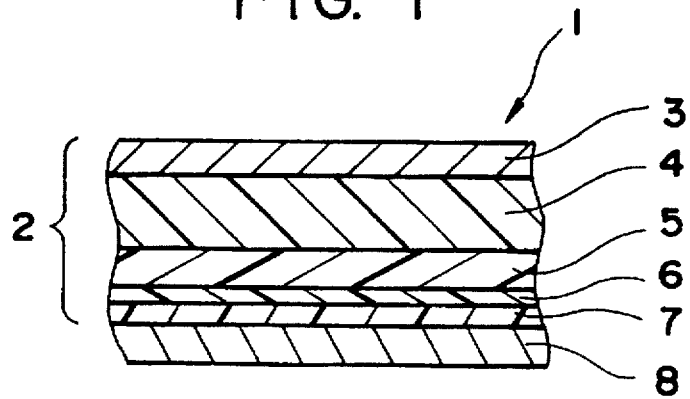
FIG. 1 is a sectional view of a first embodiment of the vibration damper material according to the invention.

Referring to FIG. 1, there is shown in section a vibration damper material of a first embodiment of the present invention. As seen in this figure, the vibration damper material 1 according to the present invention is basically composed of a laminated sheet 2 having a base stock layer (substrate) 3, a resilient layer (damper layer or vibration damping layer) 4, a primer layer (bonding layer) 5, an organic component barrier layer 6 and an adhesive layer (sticky layer) 7 laminated one on another in this order from the top to the bottom side in FIG. 1, and a release liner 8 stuck on the outer surface of the adhesive layer 7. The nature of each one of these laminated layers is discussed in detail below.

[1] Base stock layer

The base stock layer 3 itself should have flexibility (pliability) and is preferred to have satisfactory properties in cutting and punching machinability.

Either porous material or non-porous material may be employed for the base stock layer 3. The porous material may be of non-fibrous or fibrous type.

Examples of non-fibrous porous material include membrane filters, foamed materials, meshes and the like.

Examples of fibrous porous material include knit or woven fabrics, non-woven fabrics, various kinds of paper, aggregated or felted short fibre and the like. In this instance, the knit or woven fabrics include knit and woven fabrics or similar products of any knit construction or of any weave which is currently available for practical applications, for example, of plain weave, twill weave or satin weave. There is no particular restrictions on the type of knit construction, which may be, for example, of weft knitting (plain stitch), warp knitting (tricot), circular knitting, braiding, looped fabric or the like. In the case where non-woven fabric is used, there is no particular restrictions on the pack density (bulk density) of the fibre. Various kinds of paper include paper products of ordinary categories as well as various kinds of synthetic paper.

Examples of the fibre suitable for the above-mentioned fibrous porous material include natural fiber such as cellulose fibre, cotton, linter, kapok, linen, hemp, ramie, silk, wool or the like, synthetic fibre such as polyamide fibre, polyester fibre, rayon fibre, acetate fibre, vinylon fibre, acrylic fibre or the like, or a combination (e.g., by mixed spinning) of two or more kinds of these natural and synthetic fibre. The gauge of these fibre materials varies depending upon the kind of the fibre to be employed, but preferably it is normally in the range of 0.1–5.0 deniers.

Examples of the non-porous material suitable for the base stock layer 3 include films of synthetic resins such as polypropylene, polyethylene, plasticized polyvinil chloride, polystyrene and polyethylene terephthalate, and soft metal foils or sheets including lead sheet or aluminum foil.

Further, the base stock layer 3 may be constituted by a combination (e.g., in the form of a laminate) of two or more components arbitrarily selected from the above-mentioned porous and non-porous materials. For instance, it may be constituted by a laminated sheet material of aluminum foil and synthetic resin film, or by a combination of fibrous porous material and synthetic resin film which are securely bonded to each other.

The above-described base stock layer 3 itself should preferably have air permeability. This is because, when forming the resilient layer 4 by coating on one side of the base layer 3 as will be described hereinlater, the air permeability of the base stock layer 3 contributes to ensure uniform drying of the coated film in a favorable manner, preventing foaming or bubbling within the coated film and at the same time precluding the warping of the coated film which would result from uneven drying. Suitable air permeability can be found in the various non-fibrous and fibrous porous materials as mentioned above, as well as in foamed polypropylene films, polyethylene films and the like.

Especially, in the case where the resilient layer 4 to be affixed on the base stock layer 3 contains an organic component or components such as tar or oil as described hereinlater, it is preferred that the base stock layer 3 be constituted by a material of hydrophilic nature for the purpose of preventing migration of the organic components from the resilient layer 4.

[2] Resilient layer

The resilient layer 4 is constituted by an elastic (flexible) material to perform mainly the functions of suppressing vibrations and percussive sounds (hereinafter collectively referred to as "vibration damping effects" or "vibration damping properties".

Examples of the elastic material suitable for the resilient layer 4 include various kinds of rubber, namely, natural rubber, isoprene rubber, butadiene-base rubber such as butadiene rubber, styrene-butadiene rubber and butadiene-acrylonitrile rubber, diene-base special rubber such as chloroprene rubber and nitrile rubber, olefinic rubber such as butyl rubber, ethylene-propyrene rubber, acrylic rubber and halogenated butyl rubber, urethane rubber, hydrin rubber, polysulfide rubber, silicone rubber, and fluorine-contained rubber, and mixtures blending two or more of the above-mentioned rubber materials or blending the above-mentioned rubber material or materials with a synthetic resin or resins. Further, the elastic material for the resilient layer 4 may be selected from thermoplastic elastomers, for example, from polyurethane elastomer, polyester elastomer, polyamide elastomer, polystyrene elastomer, fluorine-contained elastomer and the like. Furthermore, for example, a flexible synthetic resin material such as soft polyvinyl chloride may also be employed if desired. In this regard, it is to be understood that the resilient material may be a foamed material.

If necessary, the elastic material may be admixed with various kinds of inorganic or organic additives such as pigment, filler, plasticizer (softener), anti-deterioration agent, anti-mould agent and the like, depending upon the purpose of use of the damper materials of the ultimate product.

According to the present invention, in an especially preferred form, the elastic material for the resilient layer 4 contains in its composition a vehicle selected from a member or a mixture of two or more members selected from the group consisting of asphalt, rubber, synthetic resin and cellulose derivative, and synthetic resin powder.

Examples of the vehicle component include various kinds of asphalt such as petroleum asphalt and natural asphalt, various kinds of rubber as mentioned hereinbefore, synthetic resins such as alkyd resin, epoxy resin, acrylic resin, melamine resin, urethane resin, vinyl-base resin, including derivatives and copolymers of these resins and preferably having a molecular weight of about 3,000 or higher, and cellulose derivaties such as carboxymethyl cellulose (CMC), hydroxyethyl cellulose and the like. With these materials, it becomes possible to secure vibration damping properties of high performance quality even if the thickness of the resilient layer 4 is relatively thin, as will be described hereinlater. In this regard, it is preferable to include asphalt as a major component in view of its excellent vibration damping properties combined with its favorable water-proofing property and resistance to chemicals.

On the other hand, examples of synthetic resin powder which can be suitably blended into the above-mentioned vehicle include powder of various thermosetting or thermoplastic resins such as alkyd resin, epoxy resin, silicone resin, phenol resin, polyester resin, acrylic resin, acetal resin, polyethylene resin, polyether resin, polycarbonate resin, polysulfone resin, polystyrene resin, polyvinyl chloride resin, fluorine-contained resin and polypropylene resin, or powder of copolymers of these resins, recovered powdery paint, synthetic resin powder occurring in polishing stages of plastic moldings, and synthetic resin powder as obtained by crushing plastic waste. Synthetic resins which are solid at normal temperatures can be suitably used as raw material for the synthetic resin powder.

Further, a pigment or pigments may be admixed into the synthetic resin powder if desired. Particular examples of additive pigments include inorganic pigments such as titanium oxide, cadmium sulfide, iron oxide and chromium oxide, and organic pigments such as copper phthalocyanine blue, condensed polyazo yellow and the like.

The synthetic resin powder, admixed into the vehicle, contributes to improve the vibration damping properties, adhesion to adjacent layers and water- and acid-proofing characteristics, in addition to improvements in film forming processability in coating stage.

Although there is no particular restrictions on the particle size of the synthetic resin powder, it is desired to be smaller than about 200 µm, and preferably in the range of 5 µm to 100 µm. This is because excessively large particle size of the synthetic resin powder will be reflected by inferior film-coating processability due to high viscosity or low fluidity of the coating agent.

The synthetic resin powder is admixed preferably at a rate of 10–500 parts by weight, more preferably at a rate of 50–350 parts by weight for 100 parts by weight of the vehicle.

Depending upon the composition, an insufficient content of the synthetic resin powder will lead to deteriorations in water- and acid-proofing properties, while an excessively large content of the synthetic resin powder will give rise to problems in the coating stage due to high viscosity of the coating agent, coupled with the problem that a coated film will suffer from low adhesion to adjacent layers due to deficiency of the vehicle content.

In the case where a pigment or a similar additive is blended into the synthetic resin powder, it should be blended preferably at a rate of 30–60 parts by weight, more preferably at a rate of about 40–50 parts by weight for 100 parts by weight of the synthetic resin powder. An elastic material which contains asphalt as a major component of the vehicle can be adjusted in such a way as to augment the vehicle by using pigment-containing synthetic resin powder or by using colored synthetic resin powder as obtained from recovered powdery paint.

The coating agent of the above-described elastic material is prepared, for example, by mixing the vehicle and water with stirring and dispersing or emulsifying the vehicle with water in the presence or absence of a dispersant or emulsifier, and admixing synthetic resin powder into the resulting dispersion or emulsion with stirring. In this instance, if necessary, the coating agent may be admixed with additives such as viscosity modifier, anti-freezing agent, anti-foaming agent, filler and, for the purpose of preventing cracks on the surface of the coated film and for adjusting the fluidity, the coating agent may be admixed with organic fibre such as vinylon fibre and polyethylene fibre. Further, various kinds of organic solvents may be used in the preparation of the coating agent if desired.

The coating agent, which is obtained by the above-described procedures, is preferably adjusted into a consistency falling in a viscosity range of 1,000–100,000 cps (at 20° C. and at a rotational speed of 3 rpm), and can be coated on an adjacent layer (e.g., on the base stock layer 3) by an arbitrary known coating method, for example, by means of a coating brush or coating spatula, or by spray coating using a pumping sprayer, air sprayer or airless sprayer, or by the use of a flow coater, roll coater or dipping coater.

The resilient material which constitutes the resilient layer 4 is preferably blended with an elastic component which singly has an elongation rate higher than about 500%, more preferably, with an elastic component which singly has an elongation rate higher than 1,000%. The inclusion of such an elastic material makes it possible to further improve the vibration damping characteristics and the adhesion to curved surfaces.

Examples of the elastic material which singly has an elongation rate of higher than about 500% include polyurethane rubber, natural rubber, isoprene rubber, butadiene-base rubber such as butadiene rubber, styrene butadiene rubber and the like, diene-base special rubber such as chloroprene rubber, nitrile rubber and the like, acrylic resin or rubber, polyvinyl acetate resin, and ethylene-vinyl acetate (EVA) resin. Especially preferred among these examples are polyurethane like urethane rubber, styrene-butadiene rubber, nitrile rubber and acrylic resin or rubber, and polyurethane is preferred most of all.

The elastic material is blended preferably at a rate of 10 wt % to 100 wt % and more preferably at a rate of 15 wt % to 85 wt %. If the elastic material is blended at a smaller rate, it will become difficult to obtain satisfactory adhesion to curved surfaces and to retain the damper material in a rolled or coiled form.

For mixing such an elastic material singly having an elongation rate of about 500% or higher with the above-mentioned vehicle, firstly an elastic material and water are mixed with each other with stirring, dispersing or emulsifying the elastic material with water in the presence or absence of a dispersant or emulsifier. Then the resulting dispersion or emulsion is mixed with the above-described emulsion of the vehicle under stirred condition to obtain a coating agent. In this instance, if necessary, additives similar to the ones as described hereinbefore may be added to the coating agent. This coating agent is ready for coating application on an adjacent layer (e.g., on the base stock layer 3).

The elastic material which constitutes the resilient layer 4 is desired to have an elongation rate of about 15% or higher, more preferably an elongation rate in the range of about 20% to 1500% and most preferably an elongation rate in the range of about 20% to 500%, for the purpose of ensuring especially high performance quality in vibration damping and adhesion to curved surfaces.

Considering greater possibilities of the damper materials being bonded on convexly curved surfaces rather than on other types of curves surfaces, in the case where the single-side adhesive damper material constructions have a plural number of resilient layers in the laminated sheet 2 according to the invention (i.e., the damper material constructions of FIGS. 2, 3, 5 and 6), it is preferred that a resilient layer 4a remote from a adhesive layer 7 is constituted by an elastic material with an elongation rate equivalent to or higher than that of the elastic material of another resilient layer 4b. This arrangement makes it possible to curve the damper material convexly on the side of the base stock layer 3 in a facilitated manner.

[3] Primer Layer

The primer layer 5 is an anchor coat layer which is provided between the resilient layer 4 and the organic component barrier layer 6 which will be described hereinlater, for the purpose of ensuring secure bonding between the resilient layer 4 and the barrier layer 6. To this end, the primer layer 5 is preferably constituted by an adhesive agent.

Examples of adhesive agents suitable for the primer layer 5 include thermosetting resins such as phenol resin, resorcin resin, furan resin, urea resin, melamine resin, polyester resin, polyurethane resin, epoxy resin, silicone resin and the like, thermoplastic resins such as polyvinyl acetate, polyvinyl alcohol, polyvinyl chloride, polyvinyl butyral, polyacrylic ester, nitrocellulose and the like, synthetic rubber adhesives such as of butadiene-acrylonitrile rubber or chroloprene rubber base or the like, and natural adhesives such as glue, casein, gum arabic and the like. Regarding the form of the adhesive, there are a liquid type, an organic solvent type or an emulsion type, among which any one can be selectively chosen.

The purpose of provision of this primer layer 5 is not restricted to the adhesive function as described above. In certain cases, the primer layer 5 may be formed between the base stock layer 3 and the resilient layer 4.

[4] Organic Component Barrier Layer

In the case where the resilient layer 4 is constituted by a resilient material which contains a vehicle and synthetic resin powder, as mentioned hereinbefore, the organic component barrier layer 6 functions to block permeation therethrough of organic components of the resilient material, thereby preventing the organic components from migrating into the adhesive layer 7 which will be described later. For instance, in a case where asphalt is used as a vehicle for the resilient layer 4, it prevents migration of tar and oil components contained therein into the adhesive layer 7. By the provision of this barrier layer 6 which blocks migration of organic components into the adhesive layer 7, it becomes possible to prevent degeneration or deterioration of the adhesive layer 7 including its stickiness and holding power.

Examples of the material suitable for the organic component barrier layer 6 include polymers or copolymers containing acrylic acid methacrylic acid or derivatives thereof as a base. Examples of the acrylic and methacrylic acids include esters of acrylic and methacrylic acids such as methylacrylate, methylmethacrylate, ethylacrylate, ethylmethacrylate, hydroxyethylacrylate, hydroxyethylmethacrylate, hydroxypropylacrylate, hydroxypropylmethacrylate and dimethylaminoethylmethacrylate, acrylamide, acrylonitrile and the like.

Other examples of the material suitable for the organic barrier layer 6 include polyether derivatives, polyester derivatives, polyurethane derivatives, silicone derivatives, polyimide derivatives and the like.

Especially preferred among the above-exemplified materials for the organic component barrier layer 6 are polymers or copolymers containing an acrylic or methacrylic ester as a base.

The polymer materials as represented by the above-mentioned acrylic polymers are desired to have a mean molecular weight in the range of from 50,000 to 5,000,000 and more preferably a mean molecular weight in the range of from 100,000 to 1,000,000.

If necessary, the material for the organic component barrier layer 6 may be added with, for example, viscosity modifier, filler, anti-deterioration agent, vulcanizing agent, crosslinking agent or other additives. This organic barrier layer 6 can be formed by a known coating method. In this instance, the coating agent may be either an organic solvent type or an emulsion type or aqueous solution type. The viscosity of the coating agent is preferably in the range of from 10 to 10,000 cps (at normal temperature).

The above-described organic barrier layer 6 is preferred to be of hydrophilic nature from the standpoint of augmenting the function of blocking organic components which are insoluble or hardly soluble in water like tar and oil components. Aside from those cases where the material of the organic component barrier layer 6 itself is of hydrophilic nature, it is possible to impart hydrophilic property to the surface of a coated barrier layer 6 by applying a surfactant to its surface or by a plasma treatment.

The migration of organic components into the adhesive layer 7 is completely unlikely or is likely only in a small degree in some cases depending upon the composition of the resilient material which constitutes the resilient layer 4. Further, the migration of organic components has no adverse effects on the adhesive layer 7 in certain cases. Needless to say, the organic component barrier layer 6 may be omitted in such a case.

[5] Adhesive layer

The adhesive (sticky) layer 7 serves to bond or stick the vibration damper material 1 to an adherend or structure (adherend) to be fitted with the damper material.

Examples of the adhesive suitable for the adhesive layer 7 include rubber-base adhesive, acrylic adhesive, silicone-base adhesive and the like.

Examples of the rubber-base adhesive include adhesives of natural rubber base, isoprene rubber base, styrene-butadiene rubber base, regenerated rubber base and polyisobutylene rubber base, as well as rubber-containing block copolymers such as sytrene-isoprene-styrene, styrene-butadiene-styrene and the like.

Examples of the acrylic adhesive include polymers or copolymers containing as a base an acrylic or methacrylic acid derivative such as acrylic ester, methacrylic ester, acrylamide, acrylonitrile or the like. In this regard, a copolymer of an acrylic or methacrylic ester and a monomer such as acrylic acid, methacrylic acid, acrylamide, methacrylamide, vinyl acetate, styrerie or the like is especially preferred.

In this instance, considering the properties of the adhesive under low temperature conditions (e.g., in a case where the damper material is wrapped around a structure of low temperature like a coolant pipe of an air conditioner), the adhesive is preferred to have a relatively low glass transition temperature (Tg). More specifically, the aforementioned acrylic ester is preferably in the form of an acrylic acid alkyl ester containing 1 to 11 carbon atoms and especially 2 to 9 carbon atoms in the alkyl group, while the afore-mentioned methacrylic ester is preferably in the form of a methacrylic acid alkyl ester containing 3 to 14 carbon atoms and especially 4 to 13 carbon atoms in the alkyl group. When the proportion of the component of this sort is greater, the adhesivity of the adhesive under low temperature conditions is improved.

Examples of the silicone base adhesive include dimethylsiloxane- and diphenylsiloxane-base adhesives.

The above-examplified adhesives may be a crosslinked type or a non-crosslinked type. In case of the crosslinked type, crosslinking can be effected by the use of a substance containing a group with active hydrogen like hydroxyl group, amino group or carboxyl group, epoxy group or methylol group, isocyanate, chelate resin, melamine resin, urea resin, peroxide, metal oxide, acid, acid anhydride or the like, or alternatively by ultraviolet irradiation, depending upon the nature of the functional group.

When forming the adhesive layer 7 by coating, the coating agent which contains any of the above-mentioned adhesives may be either an organic solvent type or an emulsion type, or it may be in the form of an aqueous solution type adhesive. In the case where an adjacent layer (e.g., the organic barrier layer 6) is of hydrophilic nature, it is preferred to employ an organic solvent type coating agent in order to prevent the adjacent layer from swelling by moisture absorption from the coating agent during the coating process.

If necessary, the adhesive may be added with tackifier, plasticizer, filler, anti-ageing agent or other additives. Examples of useful tackifiers include rosin and its derivatives, polyterpene, terpene phenol resin, coumarone-indene resin and petroleum resin. Examples of useful plasticizers include liquid polybutene, mineral oil, lanolin, liquid polyisoprene and liquid polyacrylate. Examples of fillers include zinc white, calcium carbonate, aluminum hydroxide, diatomaceous earth, clay, carbon powder, and various inorganic and organic fillers including the afore-mentioned pigments. Examples of useful anti-ageing agents include metal dithiocarbamate.

[6] Release Liner

Prior to use, the vibration damper material 1 has a release liner 8 which is stuck on the outer surface of the adhesive layer 7. The release liner 8 may be of a known type, for example, a release liner consisting of a paper substrate having a silicone layer formed on the side which contacts the adhesive layer 7.

The laminated sheet 2 of the vibration damper material of the above-described construction preferably has a thickness of about 0.2 mm to 5.0 mm, more preferably about 0.2 mm to 3.0 mm and still more preferably about 0.4 mm to 1.8 mm. If the laminated sheet 2 is too thin, a greater proportion in the thickness of the laminated sheet 2 will be taken up by the resilient layer 4 which needs a certain thickness to produce the vibration damping effects to a sufficient degree, restricting the number of layers of the laminated sheet 2 as a whole or necessitating to reduce the thicknesses of other layers despite degradations in performance quality. On the contrary, in a case where the laminated sheet 2 is too thick, it will become difficult to maintain sufficiently strong adhesion to surfaces of large curvatures, for example, to surfaces of pipes having a diameter smaller than 8 mm.

The resilient layer 4 in the laminated sheet 2 has a thickness (the total thickness of resilient layers when the laminated sheet 2 contains a plural number of resilient layers) preferably in the range of from about 0.1 mm to 4.0 mm, more preferably from about 0.15 mm to 2.5 mm and still more preferably from about 0.2 mm to 1.5 mm. If the resilient layer 4 is too small in thickness, one might find it difficult to secure high performance quality in vibration damping characteristics in some cases depending upon the properties of its constituent material. On the contrary, if the damper layer 4 is too thick, it might have properties (modulus of elasticity in bending) which fail to ensure satisfactory adhesion to surfaces of large curvatures. Besides, in a case where the thickness of the laminated sheet 2 is in the above-defined preferred range, it is very likely for a resilient layer 4 of a large thickness to take up a large proportion in the total thickness of the laminated sheet 2, restricting the number of layers in the laminated sheet 2 as a whole or necessitating the thicknesses of other layers despite degradations in performance quality.

The organic component barrier layer 6 in the laminated sheet 2 has a thickness (the total thickness of organic barrier layers in the case where the laminated sheet 2 contains a plural number of barrier layers) preferably in the range of from about 1 μm to 50 μm, more preferably from about 3 μm to 20 μm, and still more preferably from 5 μm to 15 μm. If the organic component barrier layer 6 is too small in thickness, its shielding or blocking characteristics might be deteriorated depending upon the nature of organic components to be blocked. On the contrary, if the organic component barrier layer 6 is too thick, it might bring about deteriorations in adhesion to curved surfaces and in vibration damping characteristics of the damper material.

There is no particular restrictions with regard to the thicknesses of the base stock layer 3, primer layer 5 and adhesive layer 7 in the laminated sheet 2. However, for the purpose of improving the strength of adhesion to curved surfaces and cutting machinability of the damper material 1, each one of these layers are preferred to have as small a thickness as possible within a range which would not impair its own functions.

Referring now to FIGS. 2 through 8, there are shown in section the second to eighth embodiments of the damper sheet constructions according to the present invention. Except the arrangement of layers in the laminated sheet 2, the damper materials 1 in these figures are the same as the above-described first embodiment with regard to the constituent materials of the respective layers. Each one of the modified damper material constructions of the second to eighth embodiments is described in greater detail below with reference to the drawings.

Figure 2:
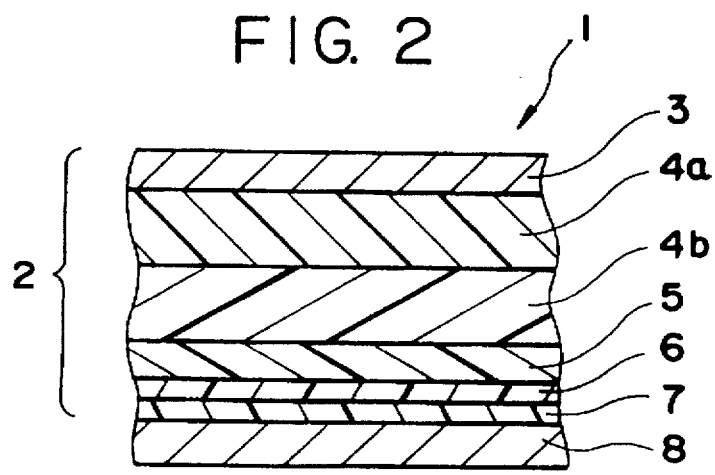
FIG. 2 is a sectional view of a second embodiment of the vibration damper material according to the invention.

The vibration damper material 1 of the second embodiment shown in FIG. 2 is composed of a laminated sheet 2 having a base stock layer 3, a first resilient layer 4a, a second resilient layer 4b, a primer layer 5, an organic component barrier layer 6 and an adhesive layer 7 laminated one after another in that order from the top to the bottom side in the drawing, and a release liner 8 stuck on the outer surface of the adhesive layer 7. The first and second resilient layers 4a and 4b are formed of elastic materials of different compositions or formed by different coating methods. The combination of the two resilient layers 4a and 4b of different properties has an advantage that they can produce synergistic effects which cannot be expected from a single resilient layer 4, for example, can produce enhanced vibration damping effects as compared with a single damper layer 4 of the corresponding thickness or excellent damping effects under low and high temperature conditions, along with improvements in heat insulation or in other properties. The two resilient layers 4a and 4b may be formed similarly or dissimilarly to each other in thickness and coating method.

Figure 3:
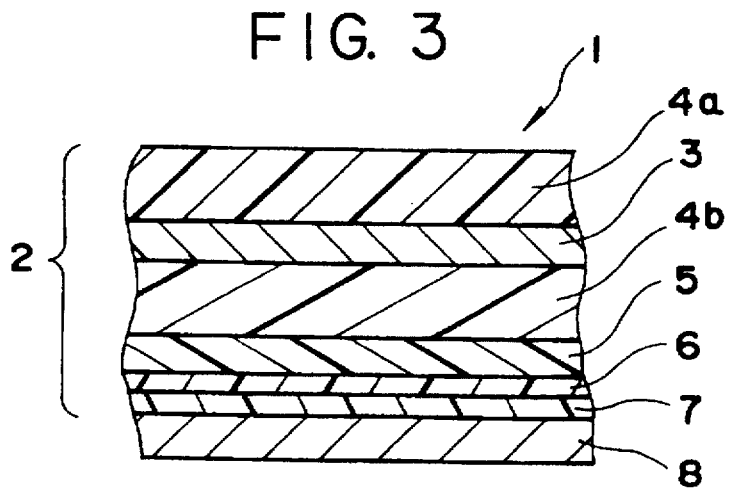
FIG. 3 is a sectional view of a third embodiment of the vibration damper material according to the invention.

The vibration damper material 1 of the third embodiment shown in FIG. 3 is composed of a laminated sheet 2 having a first resilient layer 4a, a base stock layer 3, a second resilient layer 4b, a primer layer 5, an organic component barrier layer 6 and an adhesive layer 7 laminated one after another in that order from the top to the lower side in the drawing, and a release liner 8 stuck on the outer surface of the adhesive layer 7. The provision of the first and second resilient layers 4a and 4b has the same advantageous effects as mentioned above. The laminated sheet 2 of this construction can be fabricated, for example, by coating the first and second resilient layers 4a and 4b on the opposite sides of the base stock layer 3, and then forming the primer layer 5, organic component barrier layer 6 and adhesive layer 7 successively on the side of the second resilient layer 4b.

Figure 4:
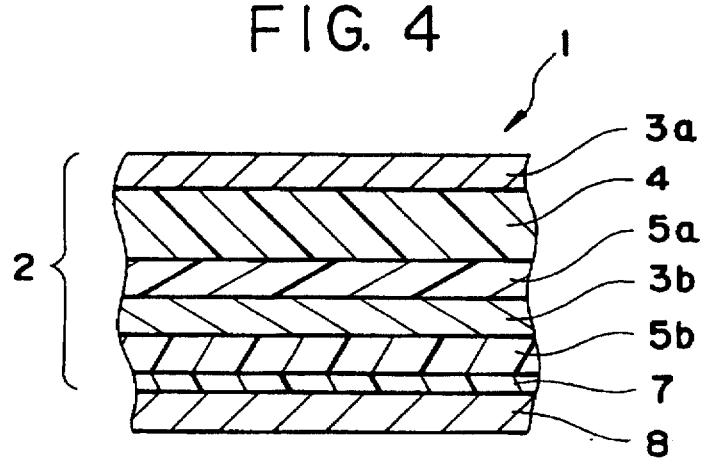
FIG. 4 is a sectional view of a fourth embodiment of the vibration damper material according to the invention.

The vibration damper material 1 of the fourth embodiment shown in FIG. 4 is composed of a laminated sheet 2 having a first base stock layer 3a, a resilient layer 4, a first primer layer 5a, a second base stock layer 3b, a second primer layer 5b and an adhesive layer 7 laminated one after another in that order from the top to the lower side in the drawing, and a release liner 8 stuck on the outer surface of the adhesive layer 7. The laminated sheet 2 of this construction can be fabricated, for example, by forming the resilient layer 4 and the first primer layer (bonding layer) 5a on one side of the first base stock layer 3a, forming the second primer layer 5b and adhesive layer 7 successively on one side of the second base stock layer 3b, and bonding the second base layer 3b to the first base stock layer 3a on the side of the resilient layer 4 through the second primer layer 5b.

Figure 5:
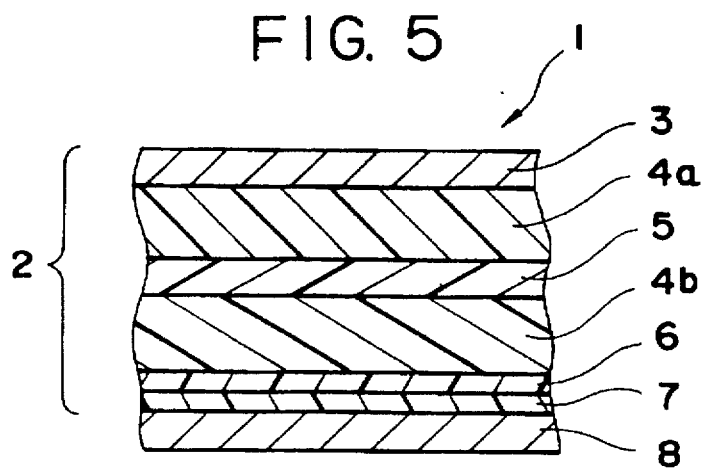
FIG. 5 is a sectional view of a fifth embodiment of the vibration damper material according to the invention.
Figure 6:
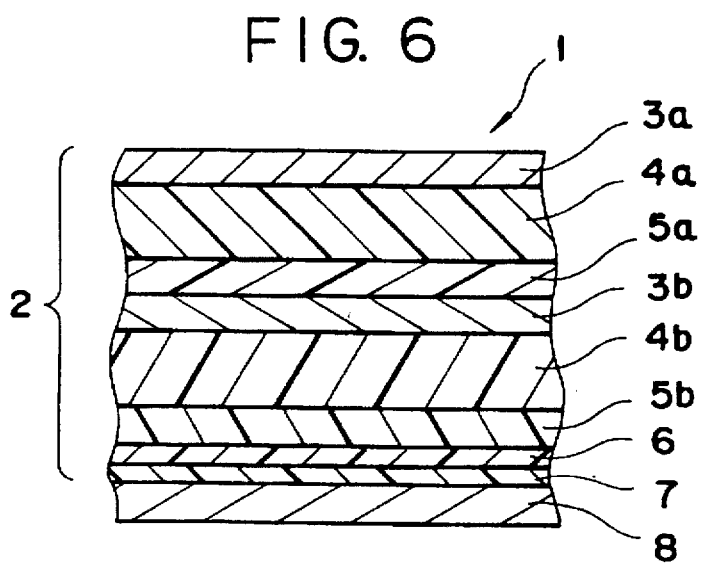
FIG. 6 is a sectional view of a sixth embodiment of the vibration damper material according to the invention.

The vibration damper material 1 of the fifth embodiment shown in FIG. 5 is composed of a laminated sheet 2 having a base stock layer 3, a first resilient layer 4a, a primer layer 5, a second resilient layer 4b, an organic component barrier layer 6 and an adhesive layer 7 laminated one after another in that order from the top to the bottom side in the drawing, and a release liner 8 stuck on the outer surface of the adhesive layer 7. The provision of the first and second resilient layers 4a and 4b has the same advantageous effects as mentioned hereinbefore. In this case, the second resilient layer 4b and the organic component barrier layer 8 are combined in such a way that secure bonding is established therebetween by their own properties.

Figure 8:
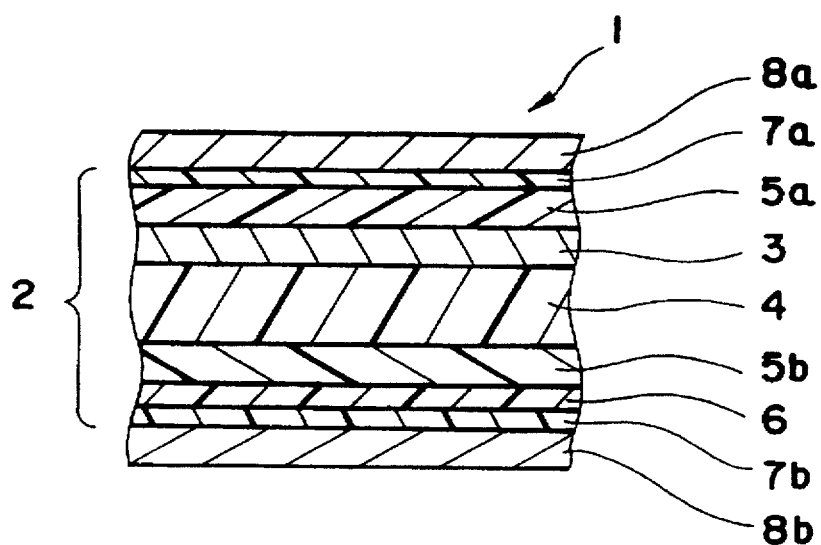
FIG. 8 is a sectional view of an eighth embodiment of the vibration damper material according to the invention.

The vibration damper material 1 of the sixth embodiment shown in FIG. 8 is composed of a laminated sheet 2 having a first base stock layer 3a, a first resilient layer 4a, a first primer layer 8a, a second base layer 3b, a second resilient layer 4b, a second primer layer 5b, an organic component barrier layer 8 and an adhesive layer 7 laminated one after another in that order from the top to the lower side in the drawing, and a release liner 8 stuck on the outer surface of the adhesive layer 7. The provision of the first and second resilient layers 4a and 4b has the same advantageous effects as described hereinbefore. The laminated sheet 2 of this construction can be fabricated, for example, by providing a first laminated sheet having the first resilient layer 4a formed on the first base stock layer 3a and a second laminated sheet having the second resilient layer 4b on the second base stock layer 3b, bonding the first and second laminated sheets through the first primer layer (bonding layer) 5a, and successively forming the second primer layer 5b, organic component barrier layer 6 and adhesive layer 7 on the side of the second resilient layer 4b.

Figure 7:
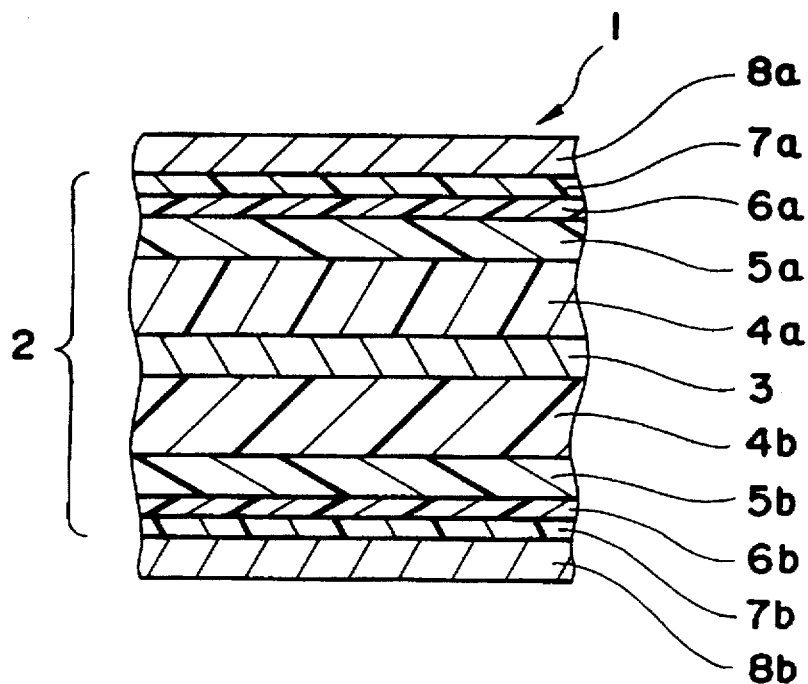
FIG. 7 is a sectional view of a seventh embodiment of the vibration damper material according to the invention.

Illustrated in FIGS. 7 and 8 are damper material constructions of the seventh and eight embodiments each in the form of a double-coated adhesive sheet (tape). In these embodiments, the respective layers of the laminated sheet 2 may be arranged symmetrically or assymmetrically between the front and back sides of the damper material 1.

The vibration damper material 1 of the seventh embodiment shown in FIG. 7 is composed of a laminated sheet having a first adhesive layer 7a, a first organic component barrier layer 6a, a first primer layer 5a, a first resilient layer 4a, a base stock layer 3, a second resilient layer 4b, a second primer layer 5b, a second organic component barrier layer 6b and a second adhesive layer 7b laminated one after another in that order from the top to the bottom side in the drawing, and first and second release liners 8a and 8b bonded on the first and second adhesive layers 7a and 7b, respectively. Regarding the respective layers which are provided in pairs, the first and second layers may be identical or nonidentical with each other in composition, physical or chemical properties, thickness or other conditions. In the case where the first and second resilient layers 4a and 4b are of different types, the damper material has the benefit of the same advantageous effects as mentioned hereinbefore. The laminated sheet 2 of this construction can be fabricated, for example, by forming the first resilient layer 4a, first primer layer 5a, first organic component barrier layer 6a and first adhesive layer 7a successively on one side of the base stock layer 3, and then forming the second resilient layer 4b, second primer layer 5b, second organic component barrier layer 6b and second adhesive layer 7b successively on the other side of the base stock layer 3.

The vibration damper material 1 of the eighth embodiment shown in FIG. 8 is composed of a laminated sheet 2 having a first adhesive layer 7a, a first primer layer 5a, a base stock layer 3, a resilient layer layer 4, a second primer layer 5b, an organic component barrier layer 6 and a second adhesive layer 7b laminated one after another in that order from the top to the bottom side in the drawing, and first and second release liners 8a and 8b stuck on the first and second adhesive layers 7a and 7b, respectively. The laminated sheet 2 of this construction can be fabricated, for example, by forming the first adhesive layer 7a on one side of the base stock layer 3 through the first primer layer 5a, and then forming the resilient layer 4, second primer layer 5b, organic component barrier layer 8 and second adhesive layer 7b successively on the other side of the base stock layer 3. The damper material 1 of FIG. 8 can be formed thinner as compared with the damper material 1 of FIG. 7 in thickness of the laminated sheet 2.

In practical applications, for example, a double-side adhesive damper material of this sort can be suitably inserted between two adherends or structures for the purpose of suppressing transmission of vibrations between them. In this regard, the damper material of the present invention can be advantageously used particularly in a case where one adherend has a cylindrical or spherical convex surface while the other adherend has a correspondingly cylindrical or spherical concave surface.

In the vibration damper material constructions according to the present invention, particularly in the constructions of the laminated sheet 2 shown in FIGS. 1 through 8, the damper material i may further include, on its surface or between the above-described layers, an additional layer or layers having other functions, for example, a protective layer, a water-repellent layer, a lubricating layer, an abrasion resistant layer, a moisture- and heat-resistant layer, a light reflecting layer, a printing betterment layer or the like.

Further, according to the present invention, basically the damper material suffices to contain at least one base stock layer, at least one resilient layer (damper layer) and at least one adhesive layer. Namely, for example, in the damper material constructions shown in FIGS. 1 through 8, the primer layer and/or the organic component barrier layer or the release liner may be omitted if desired.

Furthermore, the adjacent layers in the laminated sheet 2 may be joined with each other through a clear-cut interfacial boundary or may be Joined with each other continuously by gradual intermixing of components of the two adjoining layers in interfacial regions.

In this regard, it should be noted that it is preferable to construct the damper material in such a manner that the material or component which constitutes the resilient layer are penetrated into a part of the base stock layer along its thickness direction in order to ensure bonding between the resilient layer and the base stock layer. Preferably, the degree of the penetration is less than half of the thickness of the base stock layer. This is especially effective when the base stock layer is formed from a flexible fibrous porous material such a non-woven fabric of rayon and the resilient layer is formed of an elastical material containing asphalt. In this case, if the penetration of the materials containing asphalt exceeds the above range and therefore it is exposed from the opposite outer surface of the base stock layer, there arises a problem in that the penetrated asphalt would be attached to a surface of a feeding roller in manufacturing process or to a hand of an operator. In view of this problem, therefore, the degree of the penetration into the base stock layer is determined to about half of the thickness thereof. In this case, it is also preferable that the material of the resilient layer is penetrated into the base stock layer uniformly over the entire surface thereof which is adjacent to the resilient layer, thereby enabling to realize uniformity in quality and in vibration damping property.

The vibration damper material 1 of the present invention can be used in the form of large-, medium- or small-size sheets, labels, elongated tapes or strips or in any other arbitrary forms.

Further, the damper materials of the invention have an extremely wide range of applications, encompassing for instance electric appliances such as air conditioners, refrigerators, washing machines, ventilating fans, and the like, gas equipments such as water heaters, bath boilers and the like, office machines such as copiers, printers, facsimile machines, audio devices and the like, various industrial machines and apparatus such as compressors, hoppers, lathes, milling machines, electric power tools, various motors, precision instruments and the like, engine rooms or environs, cabins or passenger rooms, chassis, bodies of automobiles, vehicles, aircrafts, construction machines or the like, building and utility materials such as floors, ceilings, exterior doors, window frames, roofs, shutters, interior doors, sound insulation walls, vibration-proof walls, gas pipes, running water pipes and the like, office furniture such as steel desks, chairs, bookcases and the like, and daily utensils and sports goods such as coaster mats, shoe socks, metal containers, grips of golf clubs or baseball bats, helmets and skis, and the like.

The damper material of the invention, which is thin and which can easily adapt itself to a curved surface by flexure, is especially suitable for adhesion to a curved surface of a pipe, rod, ball or the like, and particularly suitable for adhesion to an object or structure with a three-dimensional curved surface. In addition, due to the excellent properties in cutting and punching machinability, the damper material of the invention can be suitably applied to the production of sheets of a complicate shape (for example, a shape of the sheet to be bonded to a curved surface having a relatively large curvature).

EXAMPLES

The present invention is illustrated more particularly by the following Examples.

<Example 1>

A laminated sheet 2 for the vibration damper material 1 having the construction shown in FIG. 1 was fabricated by coating a resilient layer 4, a primer layer (bonding layer) 5, an organic component barrier layer 6 and an adhesive layer 7 successively on one side of a base stock layer 3, and a release liner 8 was stuck on the outer surface of the adhesive layer 7.

In this instance, the resilient layer 4 was formed on one side of the base stock layer 3 by applying thereon a coating agent (with a viscosity of about 3,000 cps at 20° C.), which was prepared by emulsifying a vehicle with water adjusting the solid concentration of the vehicle at about 20 wt % and admixing synthetic resin powder and elastic material into the emulsion under stirred condition, followed by drying. A film for the organic component barrier layer 6 was formed by casting on a release liner 8, and laminated on the dried resilient layer 4 through the primer layer (bonding layer) 5. The adhesive layer 7 was formed on another release liner 8 by coating, and laminated on the organic component barrier layer 6 while peeling off the release liner 8 on the organic component barrier layer 6. The vibration damper material 1 was wound into a roll of 300 mm in width. Given below are the particulars of the respective layers.

Base stock layer (1):
Non-woven fabric of rayon
Resilient layer composition (1):
27.8 wt % of straight asphalt (vehicle)
44.4 wt % of polyvinyl chloride powder (average particle size 8 µm)
27.8 wt % of polyurethane (elongation rate 1450%)
Resilient layer elongation rate: 340%
Resilient layer thickness: 0.7 mm
Primer layer composition (1):
Acrylic adhesive containing a polyacrylic acid ester as a major component
Organic component barrier layer composition (1):
Copolymer (hydrophilic) of ethylmethacrylate and hydroxyethylmethacrylate
Barrier layer thickness: 7 µm
Adhesive layer composition (1):
70 wt % of isooctyl acrylate
10 wt % of ethylacrylate
10 wt % of vinyl acetate
10 wt % of 2-hydroxyethylacrylate
Laminated sheet thickness: 1.2 mm
Release liner (1):
Glassine release liner 7 GX (a product of Lintec Corporation)

<Example 2>

A laminated sheet 2 for the vibration damper material 1 having the construction shown in FIG. 2 was fabricated by coating a first resilient layer 4a, a second resilient layer 4b, a primer layer (adhesive layer) 5, an organic component barrier layer 6 and an adhesive layer 7 successively on one side of a base stock layer 3 by the same method as in Example 1, and a release liner 8 was bonded on the adhesive layer 7. The vibration damper material 1 was wound into a roll of 300 mm in width.

In this instance, the first resilient layer 4a was formed by coating an emulsion (with a viscosity of about 30,000 cps at 20° C.), which was prepared in water adjusting the solid concentration to about 20 wt %, followed by drying. The second resilient layer 4b was formed in the same manner as the resilient layer in Example 1. Given below are the particulars of the respective layers.

Base stock layer (2):
Paper (woodfree paper 80 g/m2)
1st Resilient layer Composition:
Styrene-butadiene rubber (elongation rate 200%)
1st Resilient layer thickness: 0.4 mm
2nd Resilient layer composition:
Same as the resilient layer composition (1)
2nd Resilient layer thickness: 0.4 mm
Primer layer composition:
Same as the primer layer composition (1)
Organic component barrier layer composition:

Same as the barrier layer composition (1)
Barrier layer thickness: 7 μm
Adhesive layer composition:
Same as the adhesive layer composition (1)
Laminated sheet thickness: 1.3 mm
Release liner:
Same as the release liner (1)

<Example 3>

A laminated sheet 2 for the vibration damper material 1 having the construction shown in FIG. 4 was prepared by coating a resilient layer 4 on one side of a base stock layer 3b in the same manner as in Example 2, coating a second primer layer (bonding layer) 5b and an adhesive layer 7 on one side of another base stock layer 3a in the same manner as in Example 1, and bonding the other side of the second base stock layer 3b on the resilient layer 4 on the first base stock layer 3a through a first primer layer (bonding layer) 5a, and a release liner 8 was bonded on the adhesive layer 7. The vibration damper material 1 was wound into a roll of 300 mm in width. Given below are the particulars of the respective layers.

1st Base stock layer (3):
Cloth fabric of cotton and polyester fibre
Resilient layer composition (3):
Urethane rubber(elongation rate 1450%)
Resilient layer thickness: 0.6 mm
1st Primer layer composition:
Same as the primer layer composition (1)
2nd Base stock layer (4):
Foamed polypropylene rubber
2nd Primer layer composition:
Same as the primer layer composition (1)
Adhesive layer composition (2):
30 wt % of natural rubber
30 wt % of styrene-butadiene rubber
27 wt % of hydrogenated rosin ester
12 wt % of petroleum product oil
1 wt % of anti-ageing agent
Laminated sheet thickness: 1.0 mm
Release liner:
Same as the release liner (1)

<Example 4>

A laminated sheet 2 for the vibration damper material 1 having the construction shown in FIG. 5 was fabricated by forming a first damper layer 4a, a primer layer (bonding layer) 5, a second damper layer 4b, an organic component barrier layer 6 and an adhesive layer 7 on one side of a base stock layer 3, and a release liner 8 was stuck on the adhesive layer 7. The vibration damper material 1 was wound into a roll of 300 mm in width.

In this instance, the first resilient layer 4a was formed by the use of the same coating agent as in Example 1, while the second resilient layer 4b was formed by applying a coating agent (with a viscosity of 40,000 cps at 20° C.), which was prepared by emulsifying a vehicle with water adjusting the solid concentration at about 30 wt % and admixing synthetic resin powder and elastic material with stirring, followed by drying. Given below are the particulars of the respective layers.

Base stock layer:
Same as the base stock layer (1)
1st Resilient layer composition:
Same as the resilient layer composition (1)
1st Resilient layer thickness: 0.3 mm
Primer layer composition:
Same as the primer layer composition (1)
2nd Resilient layer composition (4):
25 wt % of straight asphalt (vehicle)
14.6 wt % of carboxymethyl cellulose
10 wt % of epoxy resin
35 wt % of polyester powder (average particle size 10 μm)
15.4 wt % of polyurethane (elongation rate 1450%)
Resilient layer elongation rate: 65%
2nd Resilient layer thickness: 0.5 mm
Organic component barrier layer composition(2):
Copolymer of methyl- methacrylate and
2-hydroxypropylmethacrylate
Barrier layer thickness: 7 μm
Adhesive layer composition:
Same as the adhesive composition (2)
Laminated sheet thickness: 1.3 mm
Release liner:
Same as the release liner (1)

<Example 5>

A laminated sheet for the vibration damper material 1 having the construction shown in FIG. 7 was fabricated by coating a first damper layer 4a, a first primer layer (bonding layer) 5a, a first organic component barrier layer 6a and a first adhesive layer 7a on one side of a base stock layer 3 in the same manner as in Example 1 and coating a second resilient layer 4b, a second primer layer (bonding layer) 5b, a second organic component barrier layer 6b and a second adhesive layer 7b on the other side of the base stock layer 3, and first and second release liners 8a, 8b were stuck respectively on the first and second adhesive layers 7a, 7b. The fabricated vibration damper material 1 was wound into a roll of 300 mm in width. Given below are the particulars of the respective layers.

1st Release liner:
Same as the release liner (1)
1st Adhesive layer composition:
Same as the adhesive layer composition (1)
1st Barrier layer composition:
Same as the barrier layer composition (1)
1st Barrier layer thickness: 7 μm
1st Primer layer composition:
Same as the primer layer composition (1)
1st Resilient layer composition:
Same as the resilient layer composition (1)
1st Resilient layer thickness: 0.5 mm
Base stock layer:
Same as the base stock layer (1)
2nd Resilient layer composition:
Same as the damper layer composition (1)
2nd Resilient layer thickness: 0.5 mm
2nd Primer layer composition:
Same as the primer layer composition (1)
2nd Barrier layer composition:
Same as the barrier layer composition (1)
2nd Barrier layer thickness: 7 μm
2nd Adhesive layer composition:
Same as the adhesive layer composition (1)
2nd Release liner:

Same as the release liner (1)
Laminated sheet thickness: 1.8 mm

<Example 6>

A laminated sheet 2 for the vibration damper material 1 having the same construction as that of Example 1 shown in FIG. 1 was fabricated by coating a resilient layer 4, a primer layer (bonding layer) 5, an organic component barrier layer 6 and an adhesive layer 7 successively on one side of a base stock layer 3, and a release liner 8 was bonded on the outer surface of the adhesive layer 7. The components of each layer and the thickness of the laminated sheet 2 are the same as those of Example I excepting the components of the adhesive layer 7 which are shown as follows.

Adhesive layer composition:
80 wt % of butylacrylate
13 wt % of 2-ethylhexylacrylate
7 wt % of acrylate <Example 7>

A laminated sheet 2 for the vibration damper material 1 having the same structure as that of Example 1 shown in FIG. 1 was fabricated by coating a resilient layer 4, a primer layer (bonding layer) 5, an organic component barrier layer 6 and an adhesive layer 7 successively on one side of a base stock layer 3, and a release liner 8 was bonded on the outer surface of the adhesive layer 7. The components of each layer are the same as those of Example 1 excepting the components of the base stock layer 3 and the resilient layer 4 which are shown as follows.

Base stock layer (5):
Non-woven fabric of artificial silk and polyester fibre (thickness: 120 μm)
Resilient layer composition (5):
20 wt % of straight asphalt (vehicle)
30 wt % of acrylic rubber
30 wt % of calcium carbonate (filler)
20 wt % of polyurethane (elongation rate 1450%)
Resilient layer elongation rate: 300%
Resilient layer thickness: 0.7 mm
Laminated sheet thickness: 1.1 mm <Control 1>

A laminated sheet was fabricated by forming an bonding layer, a resilient layer and an adhesive layer successively on one side of a base stock layer, and a release liner was stuck on the adhesive layer, obtaining a damper sheet of 100 mm×1,000 mm. In this instance, the resilient layer was formed by bonding a sheet-like damper material on the base stock layer through a bonding layer, while the adhesive layer was formed by the same coating method as described above. Given below are the particulars of the respective layers.

Base stock layer: Aluminum sheet (0.9 mm thick)
Bonding layer thickness: Rubber base adhesive
Resilient layer composition: Natural rubber
Resilient layer thickness: 8 mm
Adhesive layer composition:
Same as the adhesive layer composition (1)
Laminated sheet thickness: about 9.5 mm
Release liner:
Same as the release liner (1)

<Control 2>

A laminated sheet was fabricated, by forming an adhesive layer on a resilient layer of the same composition as in Control 1 by the same coating method as described above, and a release liner was stuck on the adhesive layer, obtaining a damper material of 100 mm×1,000 mm. Given below are the particulars of the respective layers.

Resilient layer composition: Natural rubber
Resilient layer thickness: 8 mm
Adhesive layer composition: Epoxy adhesive
Laminated sheet thickness: About 8.5 mm
Release liner: Same as the release liner (1)

The vibration damper materials of Examples 1 to 7 and Controls 1 and 2 were examined by the following tests.

<Adhesion Test>

Adhesion of each of the vibration damper materials of the above-described Examples 1 to 7 and Controls 1 and 2 was measured by a 180° peeling test and holding power thereof was also measured. Both measurements were made according to JIS-Z0237. The results are shown in Table 1.

As seen in Table 1, the vibration damper materials of Examples 1 to 7 and Control 2 were all confirmed to have excellent adhesion and holding power.

<Vibration Damping Test>

Figure 9:
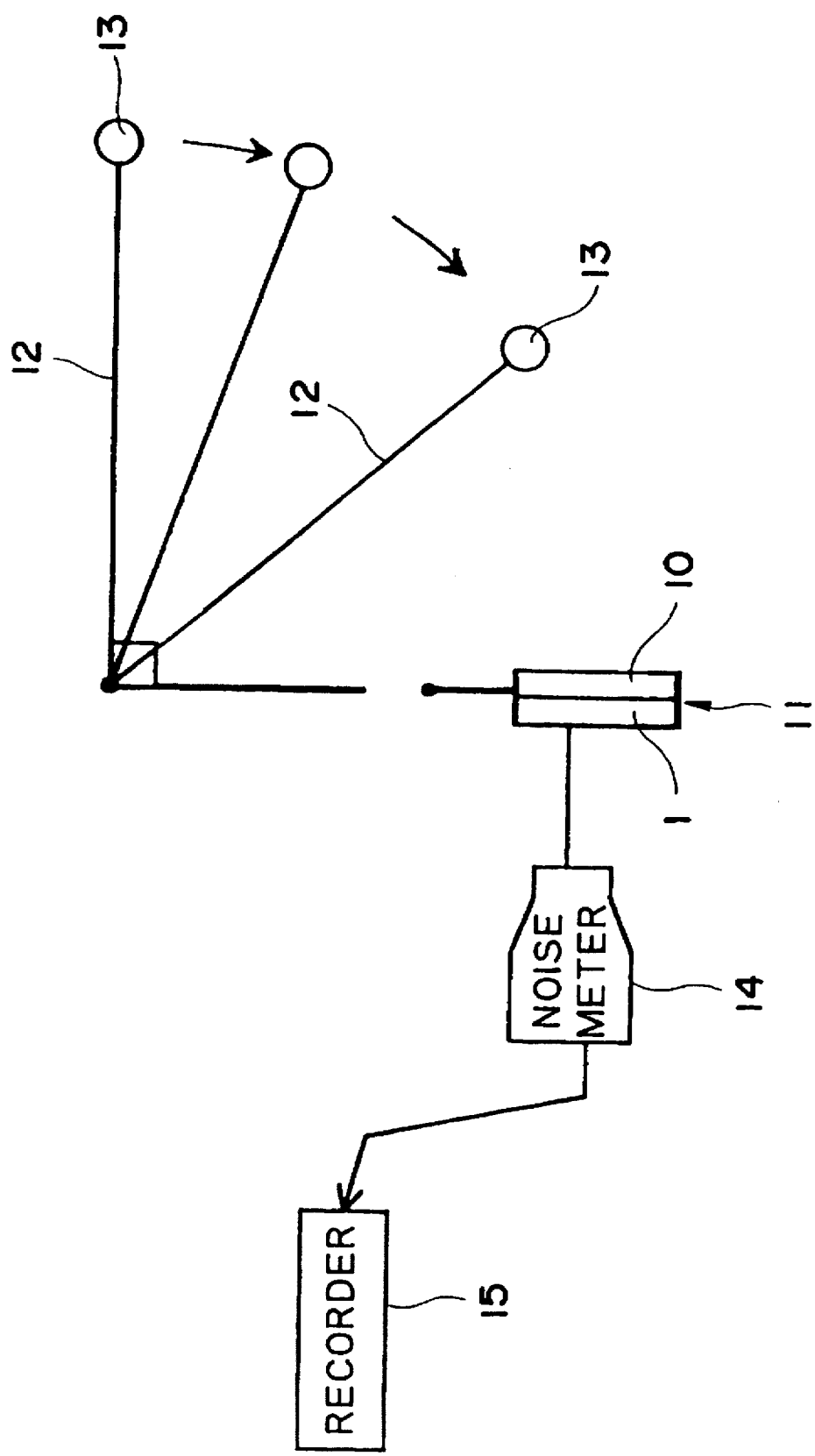
FIG. 9 is a diagrammatic illustration of a measuring method employed in the present invention for assessment of vibration damping properties.

Each vibration damper material was cut into a size of 100 mm×100 mm, and, after peeling off the release liner (one of the release liners in case of Example 5), bonded on a 0.8 mm thick 100 mm×100 mm stainless steel plate (SUS304) 10 to serve as a specimen 11 (See FIG. 9).

As illustrated in FIG. 9, the specimen 11 was suspended on a pendant thread 12, and an iron ball 13, which was fixed at the distal end of a 50 cm long thread 12 horizontally stretched out from a point 50 cm above the specimen 11, was dropped to collide against a center portion of the stainless steel plate 10 of the specimen 11. The collisional percussive noise was measured by a noise meter 14 and its level was recorded on a recorder 15. The noise meter 14 which was used for this measurement was Noise Meter (commercial name: NA20 made by Lyon Corporation)

The reductions in noise level are also shown in Table 1 in comparison with the noise level which was measured in the same manner for the stainless steel plate 10 alone.

As seen in Table 1, despite reductions in thickness of the laminated sheet and the resilient layer, the vibration damper materials of Examples 1 to 7 proved to have vibration damping properties equivalent to or higher than the vibration damper materials of Controls 1 and 2.

<Test of Adhesion to Curved Surfaces>

For the measurement of adhesion to curved surfaces, each vibration damper material was cut into a 20 mm wide and 500 mm long tape-like strip, and, after peeling off the release liner (one of the release liner in case of Example 5), the damper tape was wrapped around a round SUS rod of 10 mm outer diameter to assess the efficiency of the wrapping work and the intimacy of adhesive contact. The results are shown in the attached Table 1.

As seen in Table 1, all of the vibration damper materials of Examples 1 to 7, which were invariably reduced in thickness, exhibited excellent properties with respect to the efficiency of wrapping work on curved surfaces and adaptability to curved surfaces along with intimate adhesive contact free of air gaps or bubbles which would cause loosening of the bonded damper material during use over an extended period of time.

In contrast, the vibration damper materials of Controls 1 and 2 which lacked flexibility were difficult to wrap around a round SUS rod of 10 mm outer diameter.

<Punching Machinability Test>

Circular sheets of 3 cm diameter were continuously punched out from each vibration damper material (100 mm×1,000 mm) by the use of a die cutting machine. In this punching operation, the protrusion of the cutting edge was adjusted to assess the machinability in two modes of punching operation, i.e., a first mode (or a thorough mode) of punching the vibration damper material completely including the release liner and a second mode (or a short mode) of punching the damper material short of the release liner leaving same in unpunched state. The punching machinability in each mode of operation was assessed by eye observation, and the results are shown in Table 1.

As indicated in Table 1, thanks to the reduced thickness, the adjustment of the cutting depth was easier with the vibration damper materials of Examples 1 to 7, which showed satisfactory punching machinability in both of the first and second modes of operation.

put on sheets by the so-called automatic sticking, namely, to put on sheets automatically and successively on a machine using an elongated release liner as a carrier for the respective sheets, permitting to improve the speed of automatic sticking operations drastically.

Finally, it should be noted that the present invention is no limited to the embodiments described above. The scope of the present invention will be determined on the basis of the following claims.

TABLE 1

| Specimens | Adhesion Test | | Damping Efficacy Noise Reduction (dB) | Adhesion To Curved Surface | | Punching Machinability | |
|---|---|---|---|---|---|---|---|
| | Adhesion | Holding | | Wrapping | Contact | 1st Mode | 2nd Mode |
| Example 1 | High | High | 4.7 | Good | Excellent | Excellent | Excellent |
| Example 2 | High | High | 5.1 | Good | Good | Excellent | Excellent |
| Example 3 | High | High | 5.2 | Excellent | Excellent | Excellent | Excellent |
| Example 4 | High | High | 5.0 | Good | Good | Excellent | Excellent |
| Example 5 | High | High | 6.3 | Good | Good | Excellent | Good |
| Example 6 | High | High | 4.7 | Good | Excellent | Excellent | Excellent |
| Example 7 | High | High | 6.2 | Excellent | Excellent | Excellent | Excellent |
| Control 1 | — | — | 4.7 | Defective | Defective | Good | Defective |
| Control 2 | High | High | 4.4 | Defective | Defective | Good | Defective |

On the other hand, fine adjustment of the cutting depth were difficult with the vibration damper materials of Controls 1 and 2 with a greater thickness, failing to punch out labels clear of the release liner which should have been left unpunched.

Similar punching tests were repeated on each damper material after changing the punching pattern to a more complicate shape. The vibration damper materials of Examples 1 to 7 exhibited satisfactory punching machinability in both of the first and second modes of operation. Further, the obtained punched sheets had an excellent dimensional accuracy, and there was no losses at their corner portions. Furthermore, there was also no deformation and fins.

As clear from the foregoing description, despite the reduction in thickness, the vibration damper material of the present invention has excellent vibration damping and noise absorbing properties without frequency dependency. Besides, the high flexibility and pliability of the damper material ensures improved adhesion to curved surfaces (adaptability to curved surfaces), facilitating the bonding work on an object or structure with curved surfaces, especially on surfaces of large curvatures.

In addition, especially in case the damper material is of a sheet-like shape or tape-like shape, it can be retained in the form of a coil or roll and, because of the properties of its resilient layer, can be uncoiled or unrolled into a flat state free of permanently curled creased portions whenever necessary.

Furthermore, the excellent punching machinability of the damper material contributes to facilitate the fabrication of sheets of complicate shapes, while its relatively small thickness especially adds to the fitness for the punching operations. Particularly, no matter whether the punching operation is of the thorough mode punching through the release liner or the short mode leaving the release liner unpunched, the vibration damper material of the invention permits to make adjustments easily for selecting an appropriate mode more freely in connection with the purpose of use and the sticking method to be employed. Accordingly, it becomes possible to

What is claimed is:

1. A vibration damper material, comprising a laminated sheet, said laminated sheet including:
   at least a flexible base stock layer;
   a resilient layer comprising a vehicle and synthetic resin powder, said vehicle comprising at least one material selected from the group consisting of asphalt, rubber, carboxymethyl cellulose and hydroxyethyl cellulose; and
   an adhesive layer;
   wherein these layers are arranged in this order, and the damper material is imparted with vibration damping properties by the existence of the resilient layer.

2. The vibration damper material as set forth in claim 1, wherein said flexible base stock layer is formed from an air permeable material.

3. The vibration damper material as set forth in claim 1, wherein said resilient layer includes an elastic material that has an elongation rate from 15% to 1500%.

4. The vibration damper material as set forth in claim 3, wherein said resilient layer comprises 10 wt % to 100 wt % of an elastic material having an elongation rate of at least 500%.

5. The vibration damper material as set forth in claim 1, wherein said resilient layer is formed by a coating method.

6. The vibration damper material as set forth in claim 1, wherein said resilient layer contains organic components and wherein said damper material further comprises between said resilient layer and said adhesive layer an organic component barrier layer having a function of blocking permeation therethrough of the organic components from said resilient layer.

7. The vibration damper material as set forth in claim 6, wherein said organic component barrier layer is of hydrophilic nature.

8. The vibration damper material as set forth in claim 6, wherein said organic component barrier layer is bonded to said resilient layer through a primer layer.

9. The vibration damper material as set forth in claim 1, wherein said laminated sheet has a thickness of 0.2 mm to 5 mm.

10. The vibration damper material as set forth in claim 1, wherein said resilient layer has a thickness of 0.1 mm to 4.0 mm.

11. The vibration damper material as set forth in claim 1, further comprising a release liner removably stuck onto said adhesive layer wherein said adhesive layer is between the resilient layer and the release liner.

12. The vibration damper material as set forth in claim 11 further comprising another adhesive layer wherein the flexible base stock layer is between the resilient layer and the another adhesive layer, and a release liner is removably stuck onto the another adhesive layer so that the another adhesive layer is between the release liner and the flexible base stock layer.

13. A vibration damper material in the form of a laminated sheet, including:

at least a flexible base stock layer;

a resilient layer formed of an elastic material comprising a vehicle selected from the group consisting of asphalt, polyurethane and mixtures thereof; and a synthetic resin powder, said resilient layer containing organic components;

an organic component barrier layer for blocking permeation therethrough of organic components in said resilient layer; and an adhesive layer;

wherein these layers are arranged in this order, and the vibration damper material is imparted with vibration damping properties by the existence of said resilient layer.

14. A vibration damper material, comprising:

at least one flexible base stock layer having two sides;

a resilient layer for imparting vibration damping properties to the vibration damper material, said resilient layer being arranged on at least one of the sides of said flexible base stock layer and containing organic components;

an organic component barrier layer arranged on said resilient layer for blocking permeation therethrough of the organic components in said resilient layer; and an adhesive layer arranged on said organic component barrier layer.

* * * * *